H. A. MYERS.
SELECTING GEAR SHIFTING MECHANISM.
APPLICATION FILED SEPT. 15, 1913.
1,167,096.
Patented Jan. 4, 1916.
5 SHEETS—SHEET 3.
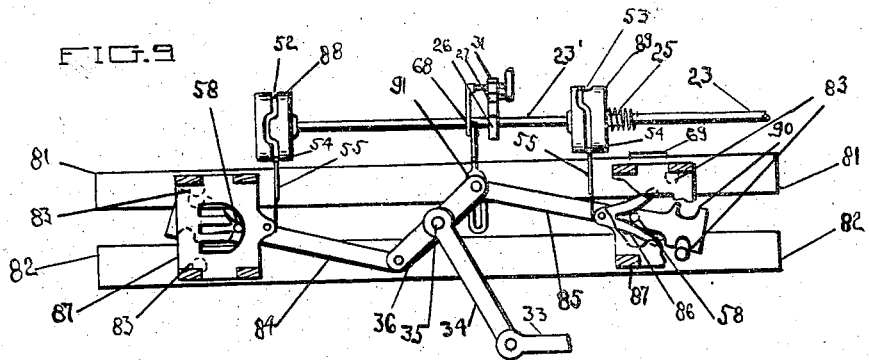
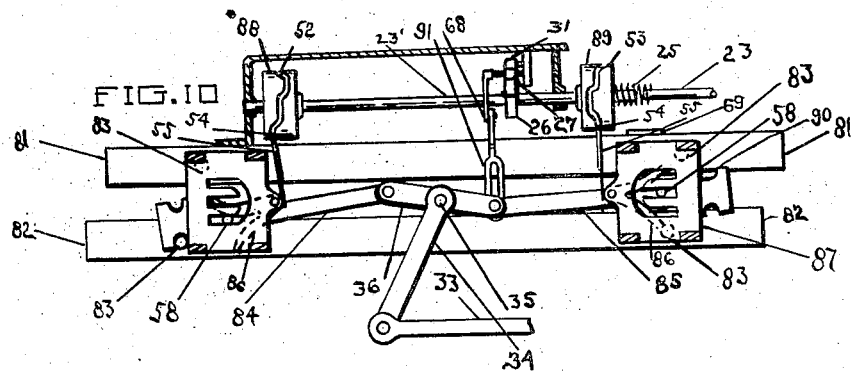
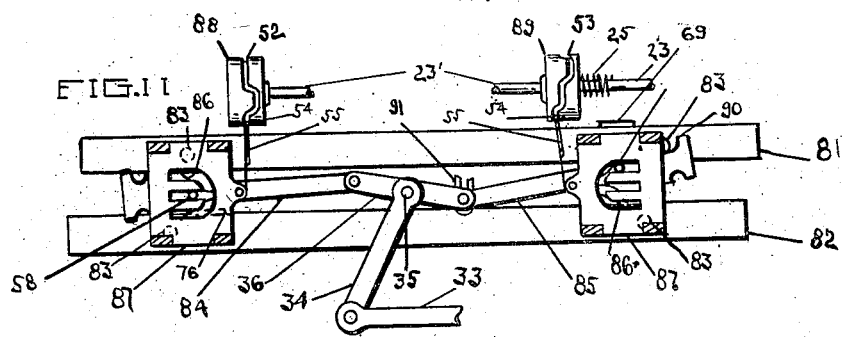
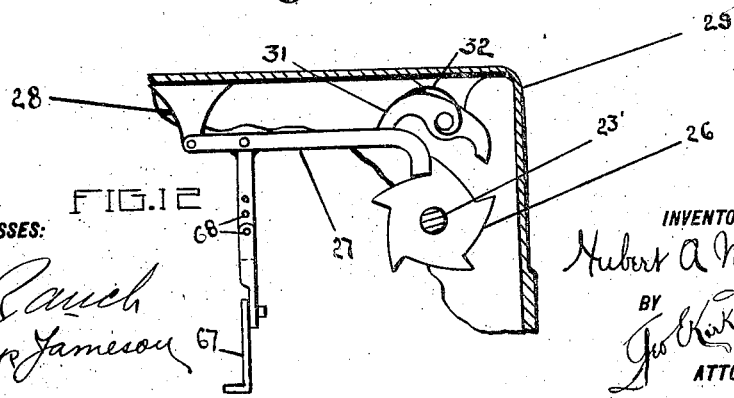
WITNESSES:
INVENTOR
Hubert A. Myers
BY
ATTORNEY

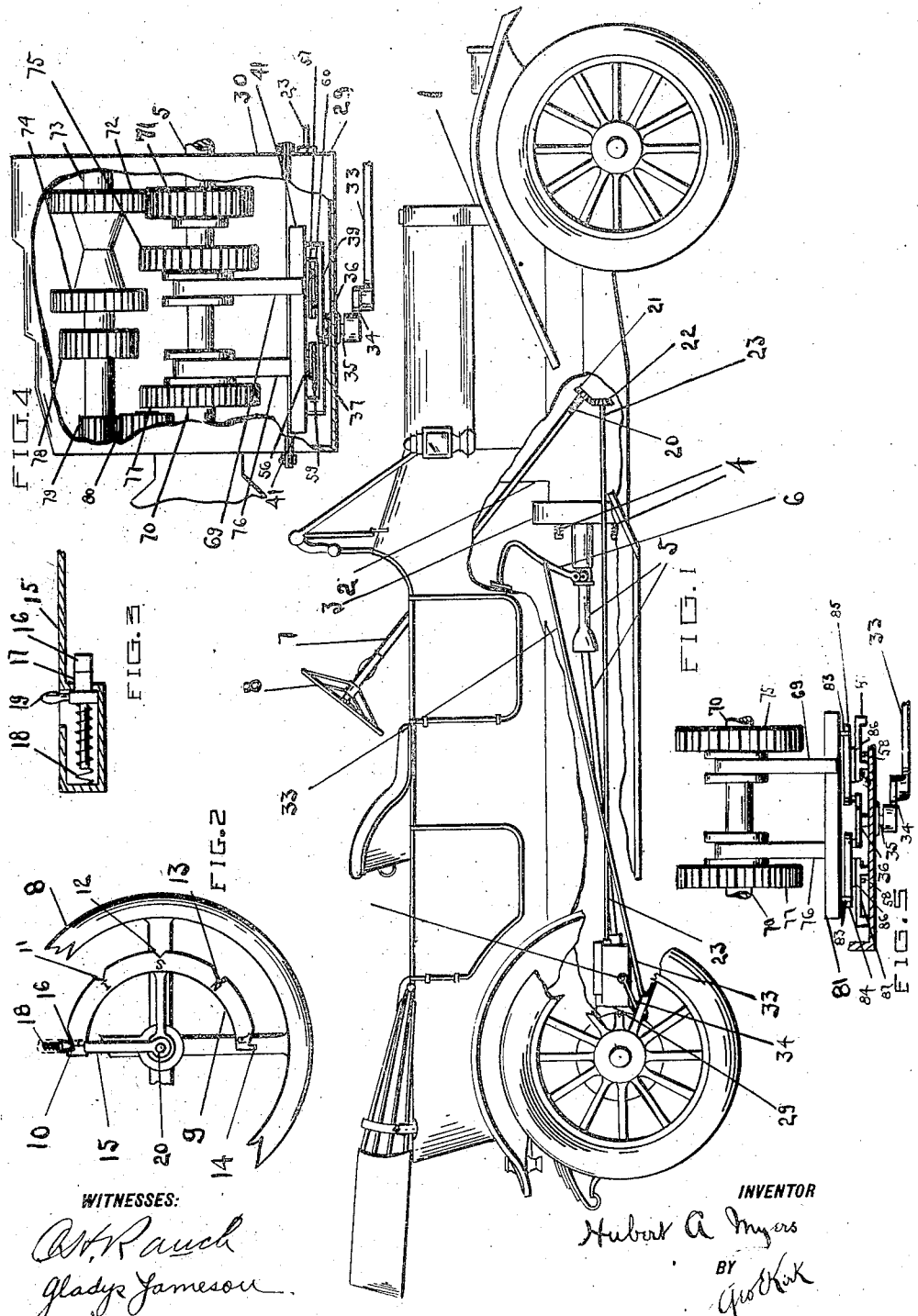

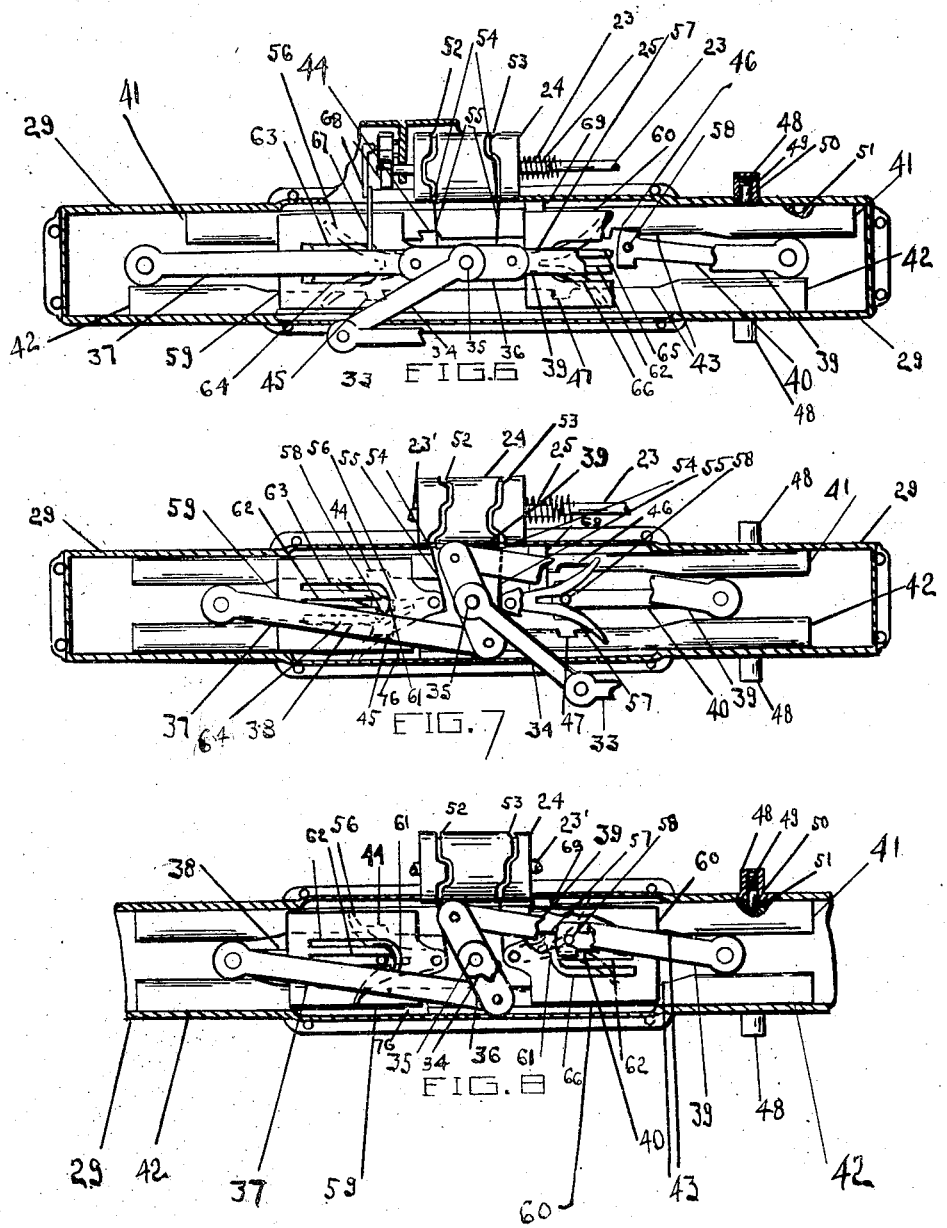

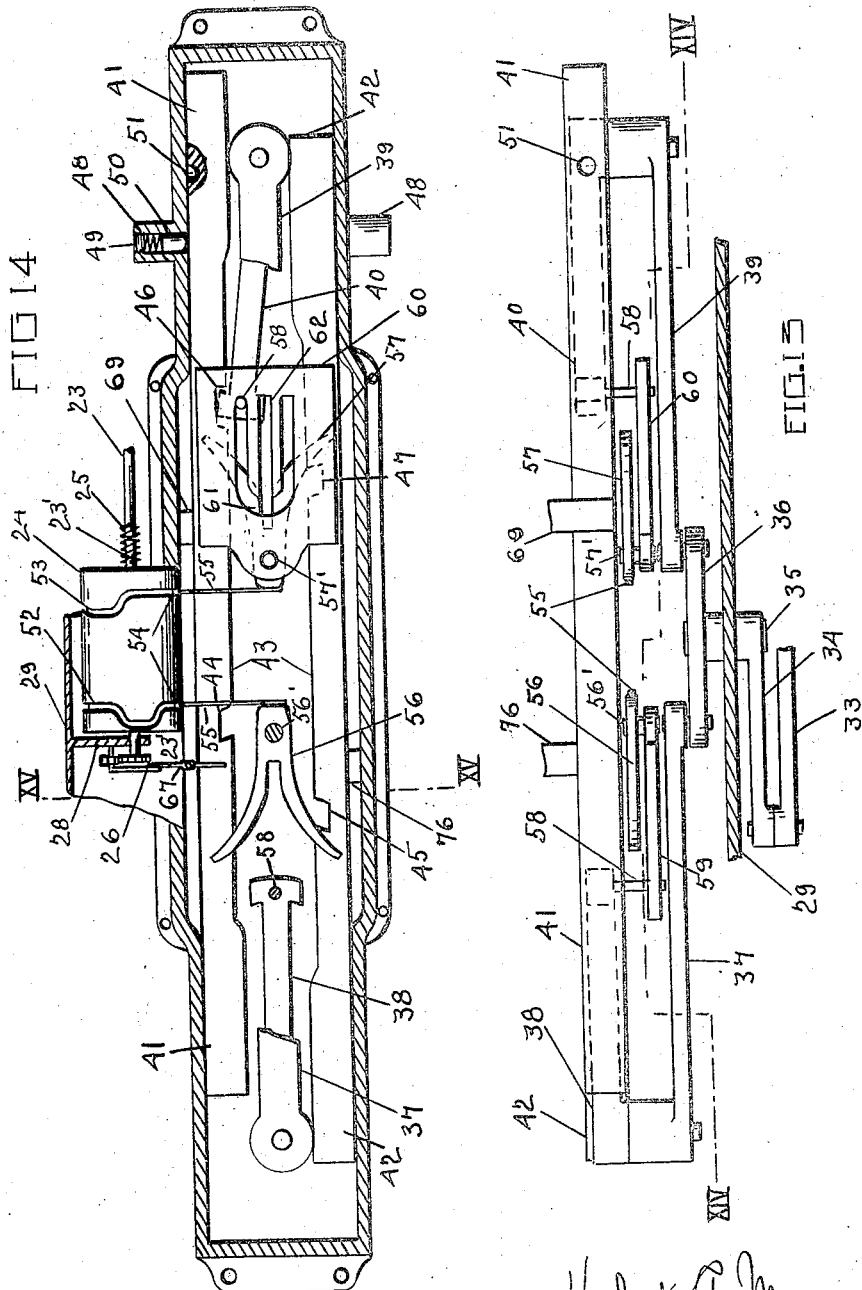

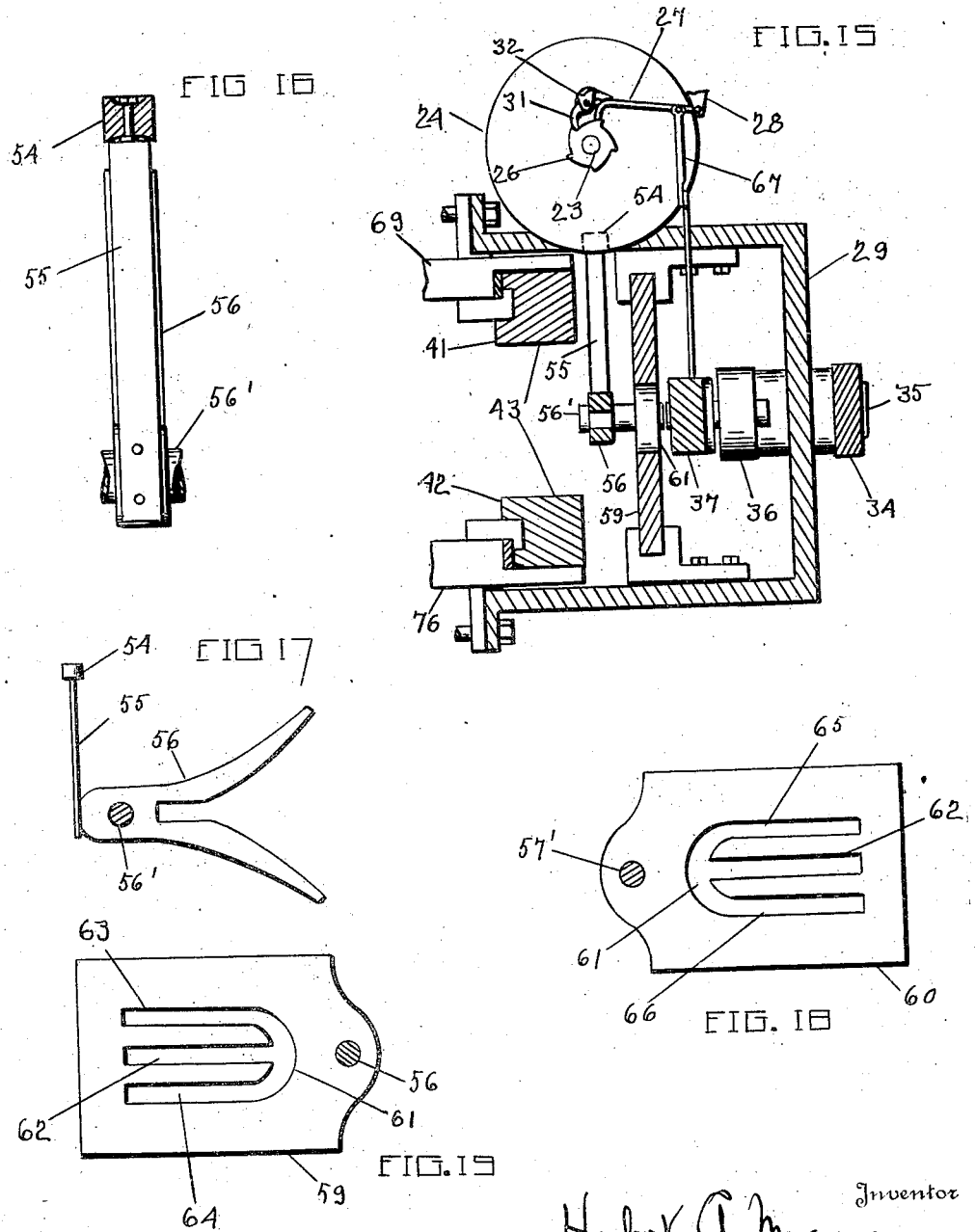

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

SELECTING GEAR-SHIFTING MECHANISM.

1,167,096.

Specification of Letters Patent.

Patented Jan. 4, 1916.

Application filed September 15, 1913. Serial No. 789,876.

*To all whom it may concern:*

Be it known that I, HUBERT A. MYERS, a citizen of the United States of America, residing at Toledo, Lucas county, Ohio, have invented new and useful Selecting Gear-Shifting Mechanism, of which the following is a specification.

This invention relates to features of simple and ready control of a machine.

This invention has utility when embodied in connection with a machine having a plurality of speeds, being especially adaptable to motor vehicles.

Referring to the drawings: Figure 1 is a side elevation of a motor vehicle, with parts broken away to show an embodiment of the invention adapted thereto; Fig. 2 is a fragmentary plan view of the steering wheel, showing the automatic check precluding shifting of the selector indicator from forward into reverse without additional manipulation; Fig. 3 is a fragmentary detail in section of the automatic check for the selector indicator; Fig. 4 is a fragmentary plan view of the transmission or speed changing gearing with the speed controller invention adapted thereto; Fig. 5 is a fragmentary plan view of the shiftable gears and another embodiment of the speed controller adapted thereto; Fig. 6 is a fragmentary side elevation of the controller of Fig. 4, showing the shifting to high speed driving, but with the parts set at neutral, so that the next shifting will be to neutral or disconnected position; Fig. 7 is a view similar to Fig. 6, but with the shift members standing at neutral position and the engagement effected for throwing into reverse or backing position; Fig. 8 is a view similar to Fig. 6, but with the shift members standing at neutral position and the engagement effected for throwing into high speed forward; Fig. 9 is a side elevation of the speed controller of Fig. 5, showing the shift members in neutral or disconnected position; Fig. 10 is a view similar to Fig. 9, but with the shift members thrown to effect reverse or backing travel of the vehicle; Fig. 11 is a view similar to Fig. 9, but with the shift members thrown to effect high speed travel forward for the vehicle; Fig. 12 is a detail of the escapement permitting selection of speeds in advance by the selector to which the speed controller may be brought by stages as may be desired; Fig. 13 is a fragmentary plan view, on an enlarged scale of the shift bars and some of the actuating connections therefor; Fig. 14 is a view similar to Fig. 6, on an enlarged scale, the elevation of the shift bars and connections being on the line XIV—XIV, Fig. 13; Fig. 15 is a section on the line XV—XV, Fig. 14; Fig. 16 is a detail view in end elevation of one of the selector guides; Fig. 17 is a side elevation of the selector guide of Fig. 16; Fig. 18 is a detail in side elevation of the right hand fixed retaining guide in Fig. 14; and Fig. 19 is a similar view of the other fixed retaining guide.

The motor vehicle 1 has the internal combustion engine or prime mover 2 for actuating through the clutch 3, as held connected by the springs 4, the driving shaft 5. The foot clutch lever 6 may be readily operated by the driver of the vehicle to connect or disconnect the motor or prime mover 2 from the shaft 5.

Mounted on the steering post 7 of the vehicle, is the steering wheel 8 in which is disposed the selector indicating quadrant 9 having the limit or high speed notch 10, intermediate and slow speed forward notches 11, 12, neutral notch 13, and reverse limit notch 14. The selector indicator arm 15 carries the plunger or automatic catch having the tapered end 16 followed by the straight portion 17. This plunger is held against the quadrant 9 at all times by the spring 18, and serves as a yieldable resistance in assisting the driver to locate the notches 11, 12. However, the arm 15 may be shifted past these points readily. The steep or straight side of the other notches operates as an effective stop for the arm 15. When traveling forward, it is accordingly impossible to throw into reverse directly, because of the notch 13. This is a safety reminder to the driver saving the machine from disastrous usage and accordingly avoiding accident and prolonging the life of the car. To overcome this automatic check catch between forward and reverse, the handle 19 may be pulled against the action of the spring 18 so that the straight side 17 of the plunger may be so withdrawn as to permit the arm 15 to ride over to reverse notch 14. The notches in this instance are so designed as to permit selection without the catch at any point in traveling away from the reverse limit to the high speed limit stop notch.

The indicator arm 15 may rotate the shaft 20 and through the bevel gears 21, 22, actuate the selector shaft 23 extending with its section 23' to the transmission gearing housing and having thereon the cam 24 free for relative rotation as to the shaft section 23, but normally actuated with the shaft 23 by the coil spring 25 therebetween.

Mounted on the selector shaft 23' is the escapement wheel 26 engaged by the dog 27 pivotally carried by the bracket 28 of the selector housing or selector and speed controller housing 29 which is attached to the transmission gearing housing 30 (Fig. 4). The auxiliary dog 31 is normally held by the spring 32 (Fig. 12) against the dog 27 to keep the dog 27 in engagement with the escapement wheel 26. The relation of these dogs is such that upon dog 27 moving to clear the wheel 26, the dog 31 will be so moved that the next tooth of the wheel will be held, thus precluding more than one tooth rotation at each lift of the dog 27. The yielding connection between the selector shaft 23 and selector shaft section 23' carrying the cam 24, thus permits the indicator selector arm 15 to be shifted, say to high speed forward with the cam 24 at neutral position, and at each release of the dog 27 the cam will automatically take its next position until the selected high speed position is reached. This is a great convenience in bringing the car up to speed with a minimum of manipulation and still protecting the car for gradual changes as against the hazards of extremes.

For effecting the selected actuation of the speed controller, the link 33 is connected to the clutch lever 6 and extends to the arm 34 fast to the shaft 35 in the speed controller housing 29. The shaft 35 has rigid therewith inside the housing 29, the cross arm 36, to one end of which is connected the link 37 carrying the dog 38, while to the other end is connected the link 39 carrying the dog 40. These dogs 38, 40 are disposed between the sliding shift members or bars 41, 42. The narrower central portions 43 on the bars 41, 42, are such that the bars are spaced from the dogs 38, 40. These narrower portions 43 have recesses or notches 44, 45, 46, 47, for the connector means or dogs 38, 40 to thus engage the shift means 41, 42.

The controller housing 29 carries minor housings 48 inclosing the compression springs 49 normally yieldably holding the plungers 50 against the shift members 41, 42. The shift members 41, 42 have recesses 51 at neutral or disconnected position into which the plungers 50 may yieldably seat to maintain the shift members in disconnected position, but automatically yielding to permit positive shifting. The cross arm 36 with each link 37 and 39 forms a toggle, so that at the initial or starting position of Fig. 6, the clutch lever 6 in its thrust forward may first release the clutch 3 from the shaft 5 before effective travel is effected by the cross arms 36. This effective travel pulls any shifted member to neutral position. In Fig. 6 this would be the drawing of the bar 41 back into alinement with the bar 42 by the dog 40 engaging the notch 46.

The selection of the desired speed control relation of the shift devices is effected from the cam 24 having the annular grooves 52, 53, for the rollers 54 on the yieldable or spring stems 55 connected to the selector guides 56, 57 respectively engaging the pins 58 of the dogs 38, 40. These selector guides are pivotally mounted by pins 56', 57' on the fixed retaining guides 59, 60 provided with slots or guide ways having the inner communicating point or junction 61. The middle guide 62 is for neutral or disconnecting position holding of the dogs 38, 40, effective when the selector guides 56, 57 direct the pins 58 thereinto. The dogs 38, 40, are then held disengaged and may not be shifted to a connecting position until returned to the junction 61, which is the common neutral disconnecting position of the mechanism. The yieldable or spring stems 55 permit the cam 24 to be rotated to make a selection, even with the pins 58 away from the junction 61. The forks of the guides 56, 57, are so configured that the pins 58 in their travel inward toward the junctions 61 may follow the ways in the retaining guides. The selector guides yield to permit such travel, but at the junctions 61, at once properly swing as selected by the cam 24 to deflect a pin 58 for the selected outward travel in a retaining way during the reverse travel of the link 33. This reverse travel occurs after the forward pull of the parts to neutral position. The way 63 in the guide member 59 holds the pin 58 for shifting the driving connection element to intermediate or second speed forward, through shifting the bar 41 rearwardly by the dog 38 engaging in the notch 44, while the lower way 64 in the guide member 59 holds the connection through the dog 38 engaging in the notch 45 for reverse or backing by shifting the bar 42 rearwardly. The way 65 in the guide member 60 holds the shifting connection for high speed forward by connecting the dog 40 with the notch 46 in the bar 41 to move forwardly, while the lower way 66 in the guide member 60 holds the connection through the dog 40 with the notch 47 for slow speed forward by moving the bar 42 forwardly. While the selection by shifting the rod 23 is yieldable, there is the rigid series of elements from the control member or clutch lever 6 directly and positively connecting for shifting the shift members 41, 42.

The indicator arm 15 is connected to effect a definite selection of speed for the mechanism establishing a plurality of driving relations for the machine or motor vehicle. The escapement 26, 27, 31, is a check device allowed by the yielding connection 25 permitting the selection by the arm 15, which device holds up actual setting of the cam 24 when the selection is for any increase of speed, but allows any setting in the decreasing or reverse. Forward settings of the cam 24 are allowed in each rocking movement of the shaft 35 by the link 37 striking the hanging bar 67 the length of which bar may be varied by the adjustment 68 to time the release of the escapement to which the bar 67 is connected. This striking of the bar 67 by the bar 37 in its upward travel raises the dog 27 to permit rotation of the wheel 26 for one tooth distance as the lifting of the dog 27 rocks the dog 31 into holding engagement with the wheel 26. This is a step by step release device for the cam selector. The operator may set the arm 15 into the notch 10, Fig. 2, the selector position for high speed ahead, when the transmission elements of the machine are at neutral or disconnected position. The first thrust forward of the pedal 6 will be followed by its return or recover travel shifting of the parts for slow, or first speed ahead due to the escapement control. Without again touching the indicator arm 15, successive complete reciprocations of the control member 6 will result in establishing driving relations of intermediate or second speed forward and then high speed forward. Each thrust forward of the pedal, through the rigid connections 33, 34, 35, 36, 37, pushes the bar 67, to operate the release device to permit a shifting of the cam 24 for each release until the cam has caught up with the indicator arm 15.

The change speed gearing (Fig. 4) or mechanism for establishing a plurality of driving relations for the device or gearing embodies the shifting fork or arm 69 connected to the shift bar or member 41. The actuation of this bar 41 forward serves to connect the driven shaft 70 directly to the driving shaft 5, while shifting in the reverse direction will effect driving from the gear 71 on the shaft 5, through the gear 72 on the countershaft 73 of the gear 74 in mesh with the intermediate speed driven gear 75 on the shaft 70. The lower bar 42 carries the shifting arm or fork 76 effective to throw the gear 77 in its forward shift in mesh with the slow speed ahead pinion 78, while the rearward shift effects reverse or back driving through the pinion 79 on the countershaft 73 with the gears 72, 74. The pinion 79 is in mesh with the intermediate gear 80 which engages the gear 77 when the gear 77 is shifted rearwardly. The speed selection and control is accordingly adapted herein to a two member shifting mechanism, opposite shifting from the intermediate disconnected position giving four driving relations.

In Fig. 9, the shift bars 81, 82, or shift members are square in cross section, instead of circular as the members 41, 42, (Fig. 6). Each of these bars 81, 82 carries two pins 83 to be engaged by the dogs 84, 85, and when so coacting with any pin 83, such dog acts as a link of a toggle connected to the cross arm 36. The dogs are shifted into the selected positions through the pins 58 thereon coacting with the selector guides 86, and are retained in such selected positions when away from central or neutral position by the retaining guides 87 having slots or ways for the pins 58. The selector guides are shifted by the cams 88, 89 on the shaft 23', having respectively the grooves 52, 53, engaged by rollers 54 on the spring stems 55 connected to rock the selector guides 86 as the cam settings control.

The operation of the device is simple and certain. The shift bars are normally retained in neutral position by the plungers 50. A speed selection from forward to reverse may not be made without releasing the plunger from engagement with the straight side of the neutral notch 13. The speed selected by placing the arm 15 at the indication desired will directly set the selector cam shaft 23' when the selection is of a slower speed, i. e., when the selection is by a movement of the arm 15 away from the notch 10. This is permitted by the escapement device. In movements toward notch 10 by the selector arm 15, the shaft 23' is urged by the spring 25 to take the selected position. Movement of the lever 6 first disconnects the clutch, and at once by continued movement the release device may trip the escapement, allowing the selecting cam to reach the selected position before the lever 6 through its link 33, and series of rigid elements has drawn any shifted bar to central or neutral position. The parts are thus all in readiness for the return travel of the lever 6 to effect the selected speed relation, or the next speed relation from the one before used in progressing toward selected relation, this latter involving a selection ahead by more than one speed and requiring successive stepping up through the escapement release of one speed at a time. The shifting to driving position occurring on the recover travel of the lever 6, is brought about by the dog engaging as selected a shift bar, and the dog in its travel held in such engagement, while the other dog is locked out by riding in the central way of the retaining guide. The toggle linkage at the limit of throw serves as an additional holding means for keeping the elements in thrown position. On this recover travel of the lever 6, the operator may with his foot determine as the lever travels how the parts are coming into driving relation. Usually the simple quick thrust and recover answers. However, in some instances some unusual condition may arise calling for extreme movements in the range of speed selection, and instead of such maximum difference in running relation between the gears being permitted to damage the gears, the operator may control their travel into meshing relation on the recover by having his foot retard the return of the lever 6. There is accordingly this further safeguard for the machine.

Different shift distances may be taken into account or under consideration and provision made therefor. For instance, the notch 46 in the device of Fig. 6 is wider than the tooth of the dog 40 with which it engages, so that the dog starts to travel before it picks up the shift bar 41. Similar results are obtained in the device of Fig. 9 wherein the notch 90 in the dog 85 is larger than the pin 83 on the bar 81. Thus a shorter shift bar travel in clutching for direct or high speed is possible.

Instead of a kick bar 67 for release of the escapement catch as adapted to the device of Figs. 6, 12, the device of Fig. 9 has the slotted bar 91 with an adjustment 68, (Fig. 12) the bar 91 being connected to raise the dog 27 from the wheel 26 on the shaft 23'. The slot of the bar 91 engages the pin of the toggle joint between the cross arm 36 and the dog 85, the slot permitting such movement of the toggle as may be found desirable before tripping of the release device takes place, according to the position of adjustment used.

What is claimed and desired to secure by Letters Patent is:

1. A driving member, a driven member, variable speed gearing therebetween, a clutch, means for operating the clutch to connect and disconnect the gearing and one of said members, shifting means having connecting positions at which it may engage the gearing, said shifting means movable to change the speed of the gearing, positive holding means for maintaining connection of the shifting means to the gearing against disconnection at other than a connecting position, and driving relation determining means operable to select the shifting means movements, there being connections from the clutch operating means to the shifting means having variable travel rate to act more rapidly in the gear shifting portion of travel and less rapidly in reconnecting the clutch disconnected before the shifting means are moved.

2. A driving member, a driven member, variable speed gearing therebetween, a clutch, means for operating the clutch to connect and disconnect the gearing and one of said members, shift members having connecting positions at which they may engage the gearing, said shift members movable to change the speed of the gearing, positive holding means for maintaining connection of the shift members to the gearing against disconnection at other than a connection position, and driving relation determining means operable to select the shift member to be connected for movement, there being connections from the clutch operating means to the shift member more rapidly actuating the shift member during the speed changing movement of the shift member than the clutch is actuated to connect to the gearing.

3. A clutch, a lever for operating the clutch, mechanism for establishing a plurality of driving relations, a series of elements connected to the lever to be operated thereby, shift members having connecting positions at which they may engage the mechanism, said shift members connected to the mechanism and operable to change the speed thereof, positive holding means for maintaining connection of the shift members to the mechanism against disconnection at other than a connecting position, the shift members having greater travel rate relatively to the lever after the lever has moved a portion of its throw, thereby permitting the clutch to be free before shifting takes place, and driving relation determining means operable at any time independently of the shift members.

4. Mechanism for establishing a plurality of driving relations comprising shifting means for the mechanism embodying reciprocable members, and actuator means including a pivoted dog for the shifting means, one of said means extending laterally beyond the other to partially embrace the other, said actuator dog being positively shiftable from an intermediate disconnected position as to the shifting means to effect opposite actuations of the shifting means.

5. A mechanism for establishing a plurality of driving relations, and shifting means for the mechanism embodying a pedal, a device actuated thereby embodying a pair of pivotally connected members and an actuator arm rigid with one of the members.

6. A mechanism for establishing a plurality of driving relations, and shifting means for the mechanism embodying a pedal, a pair of devices actuated thereby including pivotally connected members and an actuator arm rigid with one of the members.

7. A clutch, a control member for the clutch, mechanism for establishing a plurality of driving relations, and shifting means for the mechanism including an engaging means, a guide, and driving relation determining means directing the engaging means for coaction with the guide, said shifting means being connected to the control member.

8. A mechanism for establishing a plurality of driving relations, and shifting means for the mechanism, engaging means actuated by the shifting means, and a guide to hold the actuated engaging means in engaging or disengaging position during the shifting.

9. A mechanism for establishing a plurality of driving relations, a pair of shift members for the mechanism, a pivoted actuating connector oppositely swingable to engage either of said members, means for moving the swung connector for positively reciprocating with the member, and a selector for directing the swing of the connector independently of the position of the connector.

10. A mechanism for establishing a plurality of driving relations, a shift member for the mechanism, a pivoted actuating connector dog swingable to engage said member, means for moving the swung connector for positively reciprocating with the member, and a selector for directing the swing of the connector independently of the position of the connector.

11. A mechanism for establishing a plurality of driving relations, a shift member for the mechanism, and a pair of pivoted actuating connectors swingable to engage said member, means for moving the swung connector for positively reciprocating with the member, and selector means for directing the swing of the connectors independently of the positions of the connectors.

12. A mechanism for establishing a plurality of driving relations, a shift member for the mechanism, and a connector rockable into engagement with said member, means for moving the rocked connector for positively reciprocating with the member, and a selector for directing the rock of the connector independently of the position of the connector.

13. A mechanism for establishing a plurality of driving relations, adjacent shift members for the mechanism, and an intermediate actuating connector oppositely movable to engage either member, a single selector for directing the connector into actuating and non-actuating relation, and a guide for retaining the connector in mechanism shifting engagement with the selected shift member during the entire travel of the member.

14. A mechanism for establishing a plurality of driving relations, adjacent shift members for the mechanism, and an intermediate actuating connector oppositely movable to engage either member, and a single selector for actuating and non-actuating relations of the connector provided with a guide for directing the connector.

15. A mechanism for establishing a plurality of driving relations, a shift member for the mechanism, and an actuating connector movable to engage said member, a single selector for actuating and non-actuating relations of the connector provided with a guide for directing the connector, and a guide for positively retaining the connector in engaging relation or disengaging relation as directed.

16. A mechanism for establishing a plurality of driving relations, a shift member for the mechanism, an actuating connector movable to engage said member, a single selector guide for shifting the connector into actuating and non-actuating relations, and actuating means for the selector guide yieldably connected to the selector guide.

17. A mechanism for establishing a plurality of driving relations, a shift member for the mechanism, an actuating connector including a pivotally mounted dog movable to engage said member for positive shifting therewith, a selector element for shifting the connector dog, actuating means for the selector element movable in advance of the element, and a release device permitting the selector to attain the selected position determined by the actuating means.

18. A mechanism for establishing a plurality of driving relations, adjacent shifting means, intermediate actuating connector means including pivotally mounted dogs oppositely movable to engage different shift means for positive shifting therewith, selector means for determining the connector dog to be shifted and shifting the dog so determined, and actuating means for the selector means movable in advance of the selector means.

19. A mechanism for establishing a plurality of driving relations, shift means for the mechanism, actuating connector means movable to engage the shift means, selector means for shifting the connector means, actuating means for the selector means movable in advance of the selector means, and a release device connected to be actuated with the actuating connector means, said device permitting the selector means to shift the connector means as determined by the actuating means.

20. A mechanism for establishing a plurality of driving relations, shift means for the mechanism, actuating connector means movable to engage the shift means, selector means for shifting the connector means, actuating means for the selector means movable in advance of the selector means, driving connections for the actuating connector means, and a release device operable by the driving connections, said device permitting selector means to shift the connector means as determined by the actuating means.

21. A mechanism for establishing forward and reverse driving relations, an actuator having connecting positions at which it may engage the mechanism for shifting the mechanism to different driving relations, positive holding means for maintaining connection of the actuator to the mechanism against disconnection at other than a connecting position, and a shiftable selector for the actuator embodying an automatic positive catch from forward to reverse but self releasing on return, and an additional manual release for the positive catch.

In witness whereof I affix my signature in the presence of two witnesses.

HUBERT A. MYERS.

Witnesses:
   Geo. E. Kirk,
   Gladys Jameson.